(12) United States Patent
Sundberg et al.

(10) Patent No.: US 10,023,815 B2
(45) Date of Patent: Jul. 17, 2018

(54) PROCESS FOR PRODUCING HIGH OCTANE GASOLINE COMPONENT FROM RENEWABLE RAW MATERIAL

(71) Applicant: NESTE OYJ, Espoo (FI)

(72) Inventors: Aarne Sundberg, Espoo (FI); Heikki Aaltonen, Rusko (FI); Anna Karvo, Porvoo (FI); Juha-Pekka Virtanen, Raisio (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 15/393,608

(22) Filed: Dec. 29, 2016

(65) Prior Publication Data

US 2017/0190991 A1    Jul. 6, 2017

(30) Foreign Application Priority Data

Dec. 31, 2015  (FI) ..................................... 20156043

(51) Int. Cl.
*C10G 55/06* (2006.01)
*C10G 69/04* (2006.01)
*C10L 1/06* (2006.01)

(52) U.S. Cl.
CPC ............. *C10G 55/06* (2013.01); *C10G 69/04* (2013.01); *C10L 1/06* (2013.01); *C10G 2300/1011* (2013.01); *C10G 2300/1074* (2013.01); *C10G 2300/202* (2013.01); *C10G 2400/02* (2013.01); *C10L 2200/0469* (2013.01); *C10L 2270/023* (2013.01); *C10L 2290/543* (2013.01)

(58) Field of Classification Search
CPC ................................ C10G 55/06; C10G 69/04
See application file for complete search history.

(56) References Cited

U.S. PATENT DOCUMENTS

| 2010/0222620 | A1 | 9/2010 | O'Connor et al. | |
| 2011/0072715 | A1* | 3/2011 | Hanks | C10G 3/50 44/389 |
| 2011/0126449 | A1* | 6/2011 | Xu | C10L 1/1616 44/308 |
| 2013/0067801 | A1 | 3/2013 | Nousiainen et al. | |
| 2014/0262942 | A1* | 9/2014 | Arora | C10G 65/10 208/59 |

(Continued)

FOREIGN PATENT DOCUMENTS

| CA | 2 746 167 | 6/2010 |
| FI | 20145854 | 4/2016 |

(Continued)

OTHER PUBLICATIONS

FI Office Action for 20156043 dated Aug. 22, 2016, 5 pages.

(Continued)

*Primary Examiner* — Ellen M McAvoy
(74) *Attorney, Agent, or Firm* — Nixon & Vanderhye P.C.

(57) ABSTRACT

This invention relates generally to a process for producing gasoline component. More particularly, the invention relates to a process for producing high octane gasoline component using renewable raw material as an additional feedstock. Further, the invention provides a gasoline fuel component having high biocontent obtainable from co-processing of vacuum gas oil and renewable feed stock material in a catalytic cracking unit.

11 Claims, 1 Drawing Sheet

(56) References Cited

U.S. PATENT DOCUMENTS

| | | | |
|---|---|---|---|
| 2014/0296593 A1* | 10/2014 | Zhu | C07C 4/06 585/310 |
| 2014/0296594 A1* | 10/2014 | Brok | C07C 4/06 585/310 |
| 2015/0057474 A1* | 2/2015 | Nousiainen | C10G 21/20 585/16 |
| 2016/0130509 A1* | 5/2016 | Nousiainen | C10G 45/44 585/324 |
| 2016/0177201 A1* | 6/2016 | Pandranki | C10G 65/12 585/303 |
| 2016/0257888 A1* | 9/2016 | Nousiainen | C10G 3/42 |

FOREIGN PATENT DOCUMENTS

| | | |
|---|---|---|
| WO | WO 2008/114033 | 9/2008 |
| WO | WO 2014/210150 | 12/2014 |
| WO | WO 2015/055896 | 4/2015 |

OTHER PUBLICATIONS

FI Search Report for 20156043 dated Aug. 22, 2016, 1 page.
International Search Report issued in PCT/EP2016/082114 dated Mar. 17, 2017.
Canadian Office Action issued in Appln. No. 2,951,614 dated Mar. 24, 2017.

\* cited by examiner

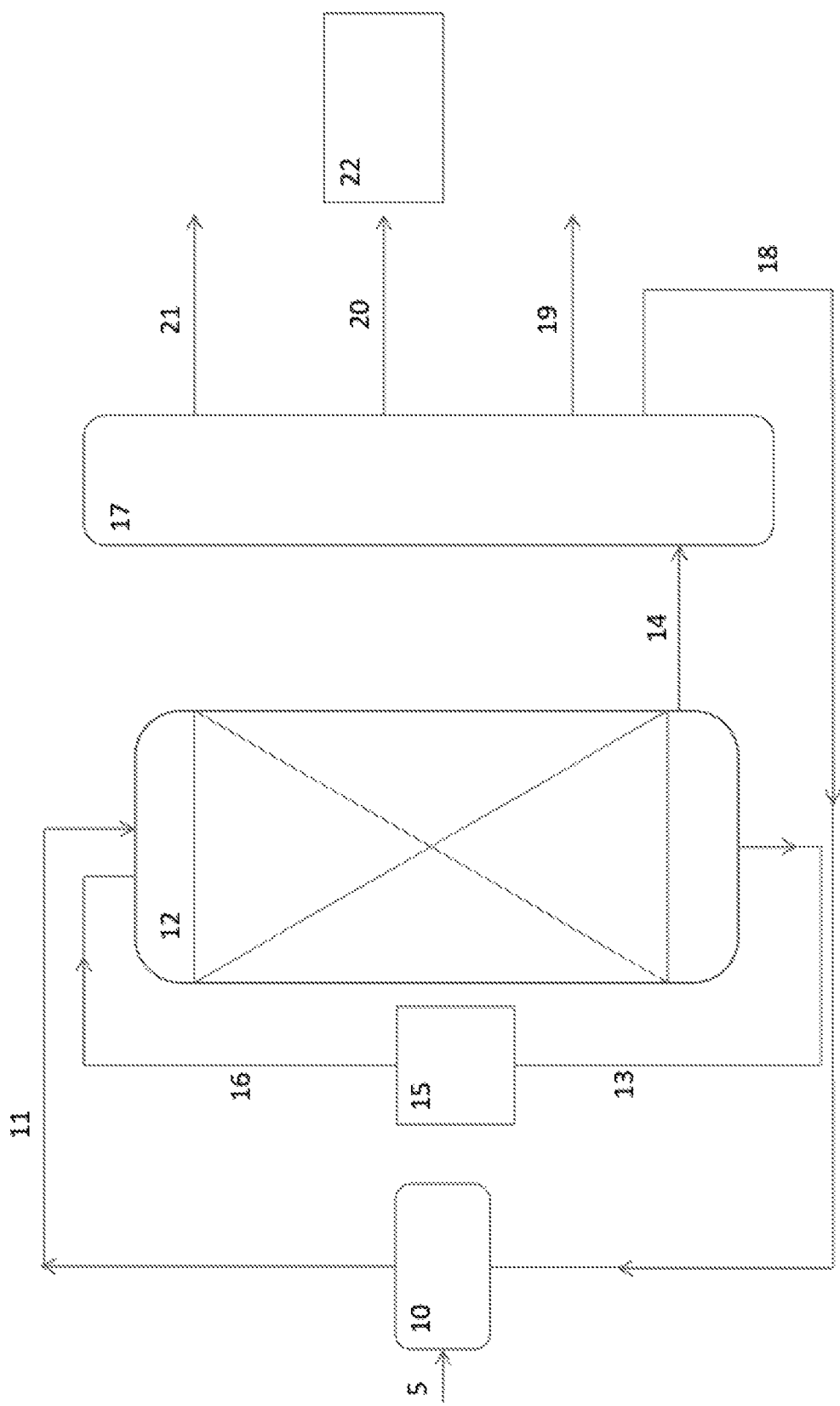

PROCESS FOR PRODUCING HIGH OCTANE GASOLINE COMPONENT FROM RENEWABLE RAW MATERIAL

This application claims priority to FI Patent Application No. 20156043 filed Dec. 31, 2015, the entire content of which is hereby incorporated by reference.

FIELD OF THE INVENTION

This invention relates generally to a process for producing gasoline. More particularly, the invention relates to a process for producing high octane gasoline component using renewable raw material as a feedstock.

BACKGROUND OF THE INVENTION

Gasoline is a volatile flammable mixture of hydrocarbons mainly hexane, heptane and octane, obtained from petroleum and used as a solvent and a fuel for internal-combustion engines. It consists mostly of organic compounds obtained by the fractional distillation of petroleum, enhanced with a variety of additives.

The characteristic of a particular gasoline blend to resist autoigniting, which causes knocking and reduces efficiency in reciprocating engines, is measured by its octane rating. Octane rating or octane number is a standard measure of the performance of an engine or aviation fuel. The higher the octane number, the more compression the fuel can withstand before igniting. Gasoline is produced in several grades of octane rating. Lead compounds are no longer used to regulate and increase octane-rating, but many other additives are put into gasoline to improve its chemical stability, control corrosiveness and determine performance characteristics under intended use.

Gasoline has conventionally been produced from crude oil of fossil origin. Demand for renewable/sustainable energy is vastly increasing. For example, the European Union requires renewable energy to have at least a 10% share of transport energy by 2020, and even higher shares are being attempted regionally.

For a renewable bio-based gasoline, efforts to date have been devoted mostly to ethanol. Other gasoline biocomponents similar to ethanol in terms of technical specifications for fuel include, for example, biobutanol and biomethanol and bioethers manufactured from it, such as methyl tert-butyl ether (MTBE). Although ethanol is the dominant liquid biofuel globally, technical restrictions limit its use in conventional gasoline cars to 10-15 v/v % (bio-energy 7-10%). The use of other alcohols and ethers as oxygenated fuels is limited by the same restrictions. Since current conventional cars will continue to take the major share of gasoline car fleets for at least the next 10-20 years, it is necessary to establish and assess biocomponent options for them.

Interesting gasoline biocomponents are produced from biomass feedstocks. Biomass can be converted to biohydrocarbons by thermochemical conversion routes which include processes in which solid, liquid or gaseous hydrocarbon-rich feedstock is gasified and catalytically conditioned to synthesis gas, which then can be further refined to higher value products such as gasoline and diesel. The generally recognized difficulty with biomass is the fact that it contains oxygen, unlike conventional hydrocarbon fuels, and historically has not been readily convertible into a form that can be easily integrated into existing hydrocarbon based infrastructure. The biological feed materials may often cause, for example, poisoning and clogging of the catalyst material used in the conventional fuel production processes. Moreover, existing steamcrackers are not designed to remove high amounts of carbonoxides that would result from the steamcracking of these biofeedstock.

Part of crude oil in the refineries producing fossil oil products from crude oil can be replaced with bio-based raw materials (the so-called "co-feed") to manufacture biogasoline. Biogasoline produced using these methods has considerably higher energy content compared to alcohols and ethers and is suitable for use as such in the existing vehicle fleet without any technical engine restrictions.

WO2008114033 discloses a process for the formation of biogasoline by the fluid catalytic cracking (FCC) of bio-oils, in particular fish oils, in combination with mineral oil. In the process the cracking produces bio-naphtha and bio-liquefied petroleum gas (LPG). The obtained bio-LPG component is post treated by alkylating or catalytically polymerizing and then combined with bionaphtha to form biogasoline.

WO2014210150 discloses a method that includes co-processing of a liquid thermally produced from biomass with a petroleum fraction feedstock in the FCC or field upgrader operations. The liquid thermally produced from biomass was produced from rapid thermal processing of a wood residue feedstock in a commercial fast pyrolysis process and is consider as renewable fuel oil (RFO).

Several publications disclose a direct processing of biomass or other oxygenated carbonaceous feedstocks in a circulating fluid bed reactor using a catalyst as the solid circulating media in an effort to directly deoxygenate the biomass and produce transportation fuels or fuel blends, as well as other hydrocarbons. Although some hydrocarbon products were produced, the yields were unacceptably low, and there was a high yield of char or coke and by-product gas produced. Moreover, often when biocontent of the fuels or fuel blends is increased, the quality of the fuel decreases.

Despite a good progress in the biofuel field there exists a need for an efficient, simple and economic process which can produce high quality fuel, especially gasoline from a renewable feedstock in high yields and yet upgrading the product quality. There is also need for good quality biocomponents suitable for use in gasoline blending without decreasing quality of gasoline.

BRIEF DESCRIPTION OF THE INVENTION

An object of the present invention is thus to provide a process so as to alleviate the above disadvantages. The objects of the invention are achieved by a process which is characterized by what is stated in the independent claims. The preferred embodiments of the invention are disclosed in the dependent claims.

The present invention provides a process for producing a high octane gasoline component from renewable raw material. The process comprises obtaining a biologically derived component and a mineral component, directing these to a cracking unit and then further distillating into different fractions. In particular, the process comprises obtaining a biologically derived component, tall oil pitch (TOP) and a mineral component, vacuum gas oil (VGO), and directing these to a catalytic cracking unit to provide a cracking product that can be further distillated to a gasoline product.

Further, the invention provides a gasoline fuel component having high biocontent obtainable from co-processing of vacuum gas oil and tall oil pitch in a catalytic cracking unit.

The invention is based on a realization that when using TOP as a co-feed in a heat and catalyst aided cracking process in a catalytic cracking unit, preferably in a thermal catalytic cracking unit, and further distillating into different fractions, an increase in both the research octane number (RON) and the motor octane number (MON) is achieved in light (gasoline) distillate when compared to a distillate of conventional VGO feed without TOP. Hence, the present invention provides a good quality fuel component having high RON and MON with less upgrading of VGO. The obtained gasoline component has high bio content and good general quality and thus provides blending possibilities especially for gasoline qualities with high octane requirements.

The gasoline component can be considered a 'drop-in' fuel; in other words, a renewable fuel component which can be blended with petroleum products, such as gasoline, without requiring significant modifications to existing fuel distribution infrastructure or vehicle engine modifications, unlike ethanol. The energy content of this bio based fuel is equivalent to that of its petroleum-based counterparts.

The inventors also found that although TOP is viscous and has high density, it may be successfully used as a feedstock in cracking without any pretreatment. Since pretreatment is potentially expensive this is an important advantage. It is also advantageous that the process of the invention may be performed in a conventional refining process equipment, that is, existing units or revamped existing units previously used entirely for fossil petroleum.

BRIEF DESCRIPTION OF THE DRAWINGS

In the following the invention will be described in greater detail by means of preferred embodiments with reference to the attached drawings, in which FIG. 1 is shows a simplified scheme of the process in a TCC unit.

DETAILED DESCRIPTION OF THE INVENTION

The present invention relates to a process for producing a gasoline component. A gasoline component is a hydrocarbon component suitable for gasoline blending. It may be used as a component when producing a gasoline meeting the quality requirements of EN228. The fuel or gasoline blend comprising the gasoline component of the invention is a biofuel or biogasoline. Biofuel refers to a renewable fuel oil, a biomass-derived fuel oil, a fuel oil prepared from the conversion of biomass or a mixture of fuel having a biomass derived component in blend with a mineral oil. Fuel refers herein to transportation fuels, which are fractions or cuts or hydrocarbons having distillation curves standardized for gasoline (0-210° C.).

Renewable feedstock of biological origin is utilized in the process of the present invention. Especially tall oil pitch (TOP) is used a feedstock, although alternative feedstock such as, for example, animal fats, and used cooking oil can be used as well. TOP is a non-volatile fraction that is separated at crude tall oil vacuum distillation. Tall oil is lignocellulosic raw material oil obtained as a by-product from cellulosic pulp cooking process. It comprises of resin acids, fatty acids, neutral materials, i.e. mainly sterols, and esters of these alcohols and acids. Tall oil is generally refined by distillation at a low pressure. Primary oil, fatty acids and resin acids are recovered as a surplus of the distillation, and TOP is generated as a distillation residue.

TOP comprises in itself alcohol esters of fatty and resin acids, oligomers of fatty and resin acids, phytosterols, high-boiling neutral matters such as spirits, hydrocarbons, etc. The use of TOP is limited, firstly by its high viscosity (3000 cP/50° C.), and secondly, by the fact that TOP is never totally rigid. Consequently, it is used in flaming torches and outdoor fire pots and similar objects. Additionally it is used as a binder in cement, an adhesive, and an emulsifier for asphalt.

A commonly used feedstock for heat and catalyst aided cracking is vacuum gas oil (VGO), which is a hydrocarbon stream recovered from one or more petrochemical refinery unit operations typically as a side cut from a vacuum column, a crude column and/or a coker column. VGO contains a large quantity of cyclic and aromatic compounds as well as heteroatoms, such as sulphur and nitrogen, and other heavier compounds, depending on the crude source and VGO cut. VGO can include, for example, light vacuum gas oil, heavy vacuum gas oil, heavy coker gas oil, light coker gas oil, and/or heavy atmospheric gas oil.

The process for producing a high octane gasoline component comprises providing vacuum gas oil (VGO) and tall oil pitch (TOP) and combining these to provide a feedstock; subjecting the feedstock to a catalytic cracking unit for cracking to provide a cracking product; fractionating the cracking product to provide at least gas stream, gasoline product, light oil and distillation bottom and recovering the gasoline product.

In the process TOP is combined with VGO either by introducing them jointly to the catalytic cracking unit or TOP is fed in a mixed feed stream or as a separate feed stream either before, after or before and after the introduction of the VGO. The feedstock contains from 5 to 25 vol-% TOP, preferably from 10 to 20 vol-% TOP, the balance being VGO.

TOP may be pretreated or it may be added to the catalytic cracking unit without any pretreatment. It is preferable that TOP is kept at a temperature around 50-60° C. or less to avoid corrosion of the free fatty acids in the TOP. It is also preferable that the feedstock material is mixed before entry to the catalytic cracking unit.

Cracking, and especially catalytic cracking, is a well-known process in refinery used for cleaving larger hydrocarbon components into smaller short-chain hydrocarbons which are usable as traffic fuel components. Cracking is achieved by breaking the carbon-carbon bonds in the hydrocarbon chain of C15 to C45 typically in the presence of a cracking catalyst. The nature of the end products is dependent on the nature of the feed and on the process conditions under which the process is carried out, such as temperature, pressure and the nature of the catalyst.

A widely used method for carrying out catalytic cracking of high-boiling, high-molecular weight hydrocarbon fractions of petroleum crude oils is a fluid catalytic cracking (FCC) process, in which a powdered catalyst is employed. The catalyst particles are suspended in a rising flow of a heavy gas oil feed to form a fluidized bed. The feed is typically pre-heated and then sprayed into a base of the riser via feed nozzles to bring the feed in contact with the hot fluidized catalyst. The temperature of a FCC cracker is typically between 500° C. and 800° C.

In a preferred embodiment the present invention utilizes a thermal catalytic cracker (TCC). The operation of a TCC unit is well known in the art. In a typical TCC unit, the preheated feedstock flows by gravity through the catalytic reactor bed. The vapors are separated from the catalyst and sent to a fractionating tower. The spent catalyst is regenerated, cooled, and recycled. The flue gas from regeneration is sent to a carbon-monoxide boiler for heat recovery. In a preferred embodiment the catalyst is an amorphous silica-alumina catalyst and the temperature in the thermal catalytic cracking unit is from 400 to 650° C.

During cracking, coke is deposited on the catalyst and this results in a loss of activity and selectivity. The coke is removed by continuously removing the deactivated catalyst from the cracking reactor and oxidatively regenerating it by contacting it with air in a regenerator. The combustion of the coke not only removes the coke but also serves to heat the catalyst to temperatures appropriate for the cracking reaction. The catalyst is continuously circulated from the reactor to regenerator and back to the reactor. Preferably the catalyst is regenerated in a separate regeneration unit outside of the thermal catalytic cracking unit.

FIG. 1 shows one embodiment of the process for producing high octane gasoline component in a TCC unit. Feedstock stream comprising VGO (vacuum gas oil) and TOP (tall oil pitch) (5) is fed to Feedstock oven (10), where feedstock is heated to 450° C. Feedstock stream (11) is supplied to TCC reactor (12) containing catalyst (amorphous aluminum silicate). Spent TCC catalyst (13) is recycled through TCC catalyst regeneration (15) and regenerated catalyst is fed (16) back to TCC reactor (12). TCC product line (14) feed the FCC product to distillation column (17), wherein fractions are directed to Distillation bottom recycle stream (18), or recovered as Light oil (19), Gasoline product stream (20) or Gas stream (21). Gasoline product stream is further fed to Gasoline Sulphur removal unit (22). The reactions take place at overpressure around 0.7 bar, the temperature of the feed being around 450° C. and the temperature of the catalyst recycle about 620° C.

The inventors have realized that especially in a TCC process high degree of cracking is achieved. The TCC catalysts can tolerate good amounts of heavy metals and other impurities and the regeneration of the catalyst is effective. Cracking of TOP therefore occurs without serious loss of activity.

The cracked mixture leaving the TCC unit passes to a fractionation tower where it is separated into various fractions. The operation of a fractionation tower is well known in the art. The fractions formed in the tower are gas stream, gasoline product, light oil and distillation bottom. The amount of each fraction formed will vary considerably depending on the nature of the feed. Typically 30% of the yield is gasoline product and 25% is diesel. The yields from feedstock including TOP are at the same level as the yields from only VGO as a feedstock. The obtained gasoline product can be further processed in desulfurization unit where sulfur compounds are removed by hydrogenation. The hydrocarbon composition, and hence the octane levels, shall remain as they were before desulfurization.

The present invention relates also to a gasoline fuel component, which comprises the cracking products obtainable from a catalytic cracking process, preferably a TCC process, in which a mixture comprising VGO and TOP is used as feedstock. Preferably the gasoline fuel component is obtainable from a mixture containing from 5 to 25 vol-% TOP, preferably from 10 to 20 vol-% TOP, the balance being VGO.

It was surprisingly found that the gasoline fuel component made using TOP as a feedstock in combination with VGO possess a significantly higher Research Octane Number (RON) than a fuel refined from VGO only. This is a very important result as higher RON fuels are becoming essential for the market place to satisfy newer engine specifications and emission requirements. A fuel with higher RON means that less upgrading of mineral oil is required.

An octane rating or octane number is a standard measure of the performance of a motor or aviation fuel. The higher the octane number, the more compression the fuel can withstand before detonating. The Research Octane Number (RON) is the most common type of octane rating worldwide. RON is determined by running the fuel in a test engine with a variable compression ratio under controlled conditions, and comparing the results with those for mixtures of iso-octane and n-heptane. Another type of octane rating, called Motor Octane Number (MON), is determined at 900 rpm engine speed instead of the 600 rpm for RON. MON testing uses a similar test engine to that used in RON testing, but with a preheated fuel mixture, higher engine speed, and variable ignition timing to further stress the fuel's knock resistance. Depending on the composition of the fuel, the MON of a modern pump gasoline will be about 8 to 12 octane lower than the RON, but there is no direct link between RON and MON.

The present invention further relates to the use of TOP in a thermal catalytic cracking process as feedstock to obtain a gasoline product. The invention shows that the increase in octane numbers actually originates from the TOP feedstock and not e.g. from changing process conditions.

It will be obvious to a person skilled in the art that, as the technology advances, the inventive concept can be implemented in various ways. The invention and its embodiments are not limited to the examples described above but may vary within the scope of the claims.

EXAMPLES

Example 1. Full Scale Co-Processing of VGO and TOP

A test run was performed using a large-scale production facility in which vacuum gas oil (VGO) is cracked to various lighter hydrocarbon products including gasoline component. The test run was performed using the process scheme as is shown in FIG. 1. The test run was started by feeding pure VGO to the process and the amount of TOP in the feedstock was increased over time. First the amount of TOP was increased to 4 t/h feed and after one day the TOP amount was further increased to 7-8 t/h, which corresponds to about 20 vol-% of the total feedstock. Samples of the gasoline product was taken at different times during the test run and analysed for various properties of which the results can be seen in Table 1 below.

The thermal catalytic cracking process was operated by heating the feedstock in an oven to about 550° C. and fed to the reactor together with the catalyst from the regeneration unit. The reactor was operated in a pressure of 0.7 bar above atmospheric pressure and the catalyst used was an amorphous silica-alumina catalyst. The catalyst to oil ratio is about 3-4:1 and the catalyst residence time in the reactor was about 150 s. The oil feedstock was cracked in the reactor and the cracking product was collected and fed to the distillation unit. The outlet temperature of the cracker was about 510° C. The spent catalyst was separated from the cracking product and regenerated at a temperature of about 620° C. in a regeneration unit before re-entering to the cracker.

The cracked products were fractionated in a distillation column with several outlets. The gasoline range boiling products were analysed and compared to gasoline product obtained with pure VGO as the feed (Table 1).

TABLE 1

Analysis results of the gasoline product from the TOP test run.

|  | VGO | TOP addition | | |
|---|---|---|---|---|
|  |  | 4 t/h | 7-8 t/h | 7-8 t/h |
| timepoint (days) | 0 | 1 | 2 | 5 |
| aromatics | 27.6 | 28.2 | 30.7 | 31.3 |
| MONc | 82.2 | 82.6 | 82.6 | 82.1 |
| naphthens | 14.1 | 14.8 | 8.5 | 8.1 |
| olefins | 18.0 | 17.3 | 31.4 | 29.8 |
| paraffins | 40.3 | 39.7 | 29.4 | 30.8 |
| RONc | 92.1 | 92.8 | 93.2 | 92.8 |
| density | 766.5 | 768.1 | 769.2 | 769 |

The analysis of the gasoline product shows that both the MON and RON value increase when TOP is added to feedstock. The amounts of naphthenes and paraffins on the other hand decrease while the amount of olefins increases in the gasoline product when TOP is added to the feedstock. It can thereby be concluded that adding TOP to the feedstock not only enables production of gasoline products from renewable feedstock but also actually result in a gasoline product with better properties and enables production of high quality gasoline component with increased bio content.

Example 2. Bench-SCALE REACTION with 100% TOP

A pilot-scale reactor research equipment was used in order to simulate the TCC unit. The pilot-scale reactor was charged with 1.5 kg amorphous alumina-silica catalyst (used regenerated catalyst from actual cracker unit). The weight hourly space velocity (WHSV) was set to 0.02 1/h. The reaction temperature used was 460° C. and the reactor was run at atmospheric pressure.

VGO was used as the reference feedstock and pure 100% TOP as the test feedstock. The cracked product was fractionated using distillation and gasoline boiling range product was collected, boiling in the range of 0-180° C.

The amount of sample collected from the test run was so small that RON or MON could not be measured directly from the neat product. Instead the product was blended with 98E5 quality gasoline in 10 and 20 vol-% blends. The RON value was measured from the pure gasoline component and the blends. From the results the RON of the cracked product was calculated as the difference between the value of the gasoline component and the blend. The gasoline component from the pure VGO test run had a calculated RON value of 82 and the pure TOP a calculated RON value of 89.

Thereby, it could be established that the increase in octane number from the full scale process could also be reproduced using the test reactor and high grade gasoline with bio content could be established. It was also shown that the increase in octane actually originates from the TOP feedstock and not e.g. from changed process conditions in the TCC unit.

The cracked TOP product was also analyzed using a GC-MS method in order to identify compounds with known high octane value. Ten compounds with the highest known RON values were chosen as marker compounds (Table 2). All ten compounds could be identified in the TOP cracking product. The amount of the compounds varied between 0.1 wt-% to 3 wt-% in the TOP cracking gasoline product.

TABLE 2

RON and MON values (measured as blending components in standard gasoline) of ten marker compounds identified in the TOP cracking product in the gasoline boiling range.

| | Compound | RON (blend) | MON (blend) |
|---|---|---|---|
| 1 | 2,3-dimethyl-2-butene | 185 | 144 |
| 2 | 2,3-dimethyl-2-pentene | 165 | 145 |
| 3 | 2-methyl-2-pentene | 159 | 148 |
| 4 | Cis-2-pentene | 154 | 137 |
| 5 | Trans-3,4,4-trimethyl-2-pentene | 151 | 144 |
| 6 | 1,3,5-trimethyl-benzene | 171 | 137 |
| 7 | 1-methyl-3-isopropyl benzene | 154 | 136 |
| 8 | 1,3-diethyl benzen | 155 | 144 |
| 9 | 1-methyl-4-propyl benzene | 152 | 139 |
| 10 | 1,2,4-trimethyl benzene | 148 | 124 |

The invention claimed is:

1. A process for producing a gasoline component, comprising the steps of:
   providing vacuum gas oil (VGO) and tall oil pitch (TOP);
   combining the VGO and TOP to provide a feedstock consisting only of VGO and TOP;
   subjecting the feedstock consisting only of VGO and TOP to a catalytic cracking unit for cracking to provide a cracking product;
   fractionating the cracking product to provide at least gas stream, gasoline product, light oil and distillation bottom; and
   recovering the gasoline product.

2. The process of claim 1, wherein the gasoline product is further processed in a desulfurization unit where sulfur is removed by hydrogenation.

3. The process of claim 1, wherein the catalytic cracking unit is a thermal catalytic cracking unit.

4. The process according to claim 3, wherein the catalyst is an amorphous silica-alumina catalyst and the temperature is from 400 to 650° C.

5. The process according to claim 3, wherein the catalyst is regenerated in separate regeneration unit outside of the thermal catalytic cracking unit.

6. The process according to claim 1, wherein the feedstock consists only of 5 to 25 vol-% TOP, the balance being VGO.

7. A gasoline fuel component, comprising cracking products obtainable from a catalytic cracking process, in which a mixture consisting only of VGO and TOP is used as feedstock.

8. The gasoline fuel component of claim 7, wherein the cracking product is obtainable from a thermal catalytic cracking process, in which a mixture consisting only of VGO and TOP is used as feedstock.

9. The gasoline fuel component of claim 7, wherein the mixture consists only of 5 to 25 vol-% TOP, and the balance being VGO.

10. The process according to claim 1, wherein the feedstock consists of 10 to 20 vol-% TOP, the balance being VGO.

11. The gasoline fuel component of claim 7, wherein the mixture consists only of 10 to 20 vol-% TOP, the balance being VGO.

* * * * *